Oct. 13, 1936.   F. A. JOSEPH   2,057,491
CONTROL OF CLUTCHES IN AUTOMOBILES
Filed July 14, 1930   3 Sheets-Sheet 1
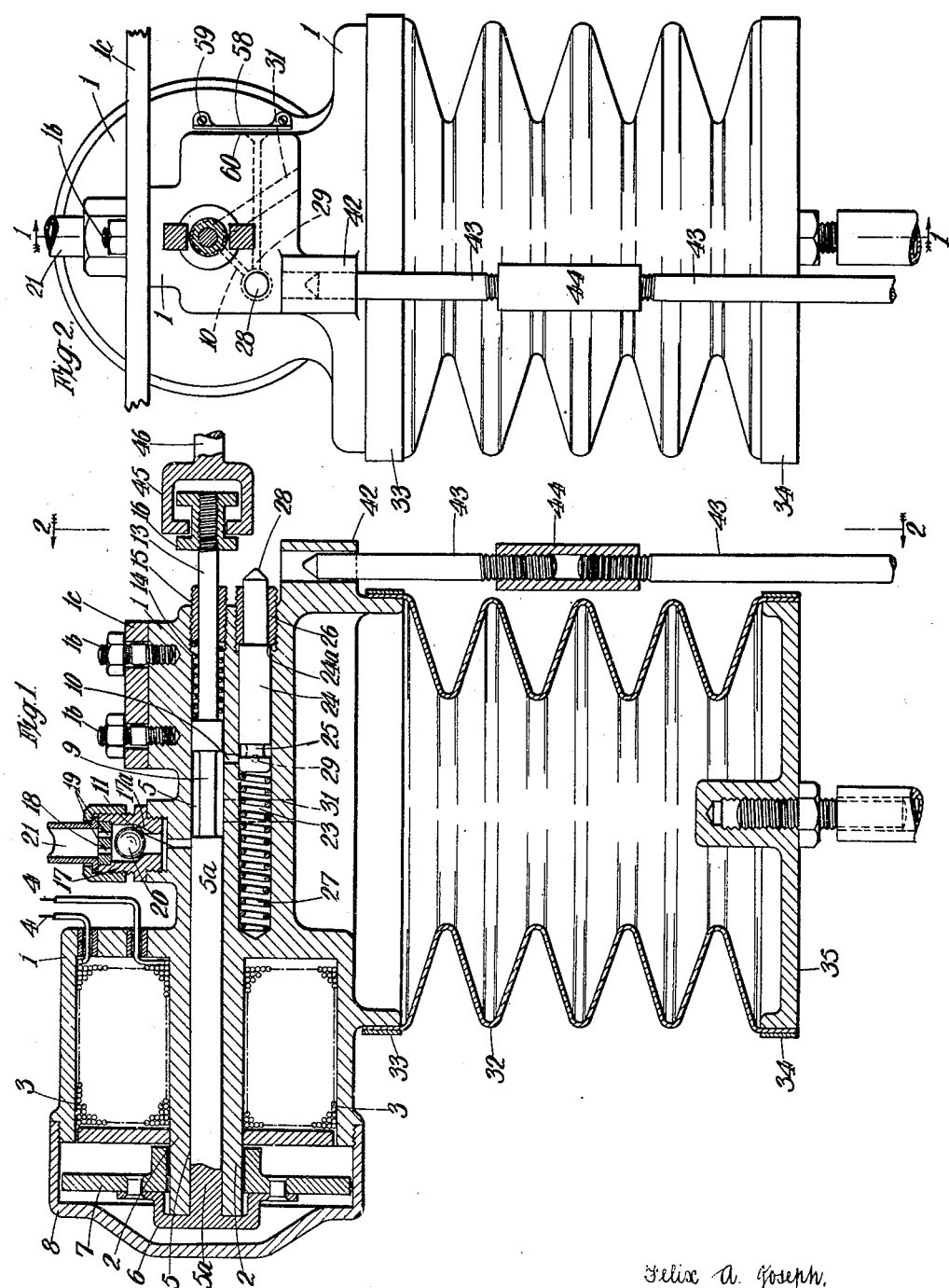

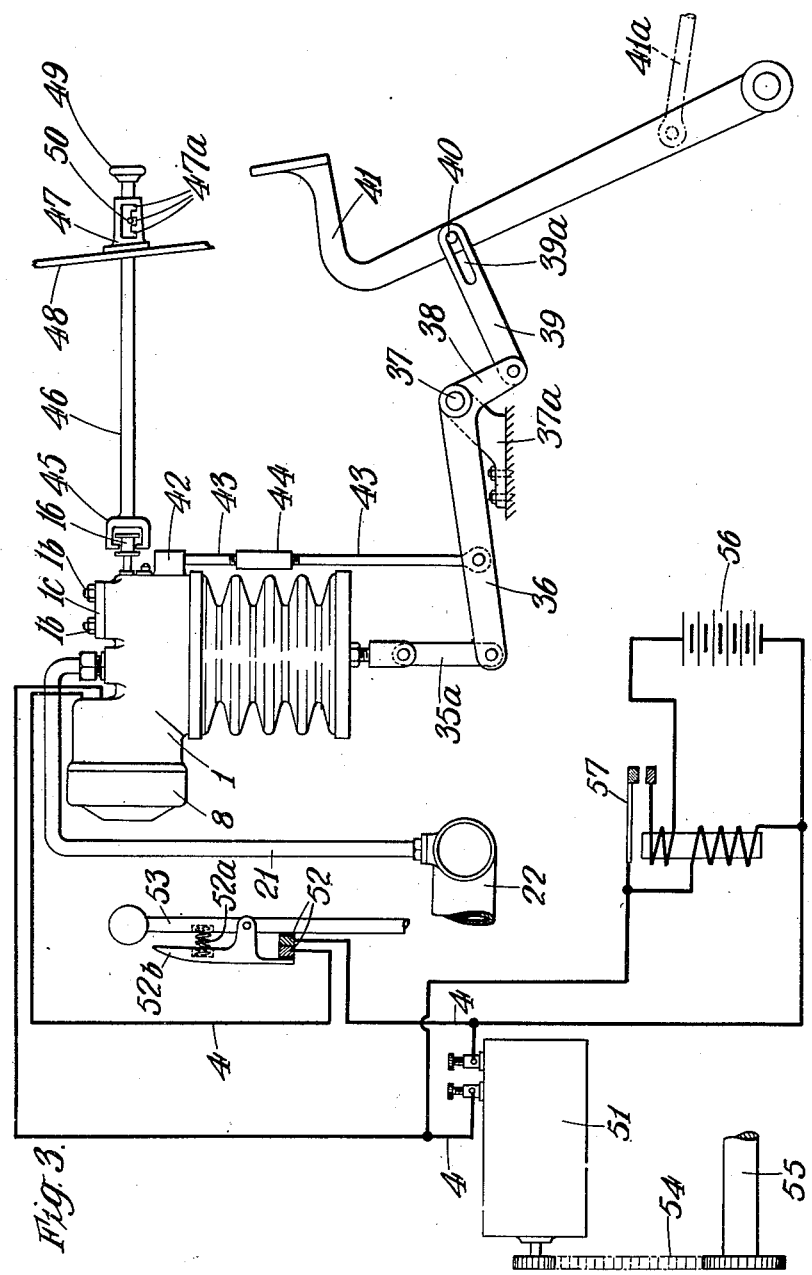

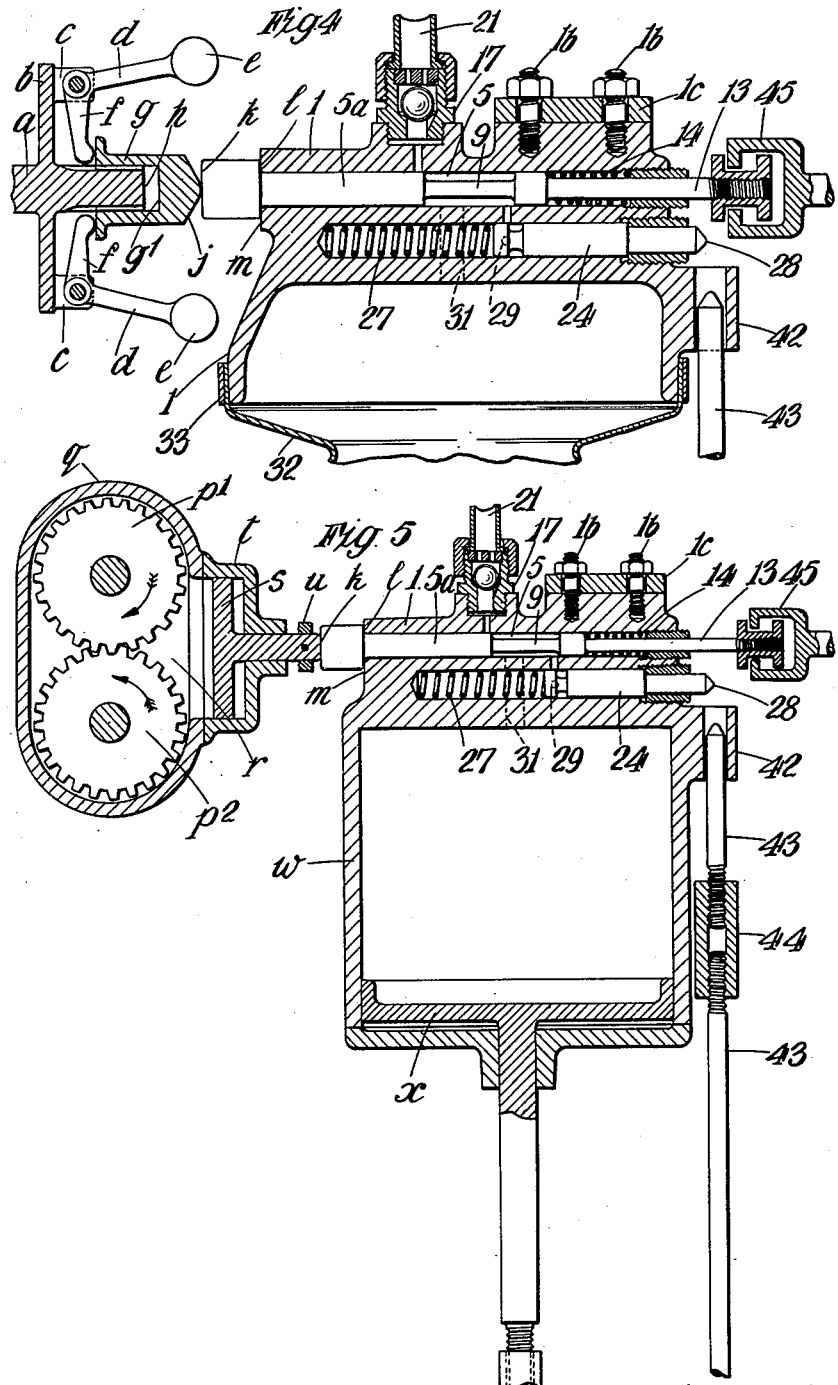

Patented Oct. 13, 1936

2,057,491

UNITED STATES PATENT OFFICE 2,057,491

CONTROL OF CLUTCHES IN AUTOMOBILES

Felix Alexander Joseph, Hampstead,
London, England

Application July 14, 1930, Serial No. 467,828
In Great Britain May 8, 1930

3 Claims. (Cl. 192—91)

This invention relates to the control of clutches in automobiles.

The object of the invention is to provide improved means for operating such clutches, said means comprising automatic or semi-automatic means to lessen the fatigue of driving.

When driving an automobile in traffic, considerable fatigue may be engendered by constant operation of the usual clutch pedal. In a traffic block the driver has either to maintain pressure on the clutch pedal whilst waiting to be able to move on or else to move the gear lever into neutral in order to rest his foot. The latter course necessitates re-engaging a gear, to accomplish which the clutch has again to be operated.

This invention enables all such operations of the clutch to be accomplished automatically by the device itself so that when the car is about to come to rest, and whilst at rest, the clutch is disengaged automatically and held disengaged until the driver accelerates the engine to move on.

Furthermore, normal operation of the usual clutch involves muscular effort which, considering the advance made in other directions of automobile design in recent years, is crude and objectionable. This invention further enables the clutch to be disengaged by the operation of an exceedingly light control which brings into action a power mechanism for operating the clutch, thus relieving the driver of much fatigue.

Other important and valuable features of the invention will be apparent in the detailed description which follows.

According to the invention, I provide in an automobile having a clutch, a power mechanism associated with mechanism for operating said clutch, an automatic governor associated with and adapted to control said power mechanism to cause disengagement of said clutch automatically when the speed of the engine is below a certain speed. Furthermore, the said governor is adapted to control the said power mechanism to permit the clutch to engage automatically when the speed of the engine is above a predetermined value.

According to a further feature of this invention, a control mounted on the gear lever is adapted to operate the said power mechanism so that both the gear lever and the clutch may be operated by the driver with one hand. The said governor may be electrical, mechanical, hydraulic or of any other nature.

In a preferred form the governor comprises an electro magnetic valve or device connected with a dynamo driven by the engine of the automobile, the voltage of the dynamo varying with the speed of the engine which, in turn, varies the pull on the armature of the governor. The dynamo may be that usually provided for charging the accumulator of the car and the presence of the accumulators in the electrical system has the advantage of preventing an excessive rise of voltage at high engine speed. The said valve controls a hydraulic system adapted to derive its power from the induction system of the engine and connected with the clutch actuating mechanism.

The usual type of dynamo provided in an automobile is designed to give a certain maximum output of current. The electrical equipment usually includes an automatic cut-out which automatically connects the accumulator to the dynamo when the dynamo voltage has risen to a suitable figure and disconnects the accumulators when the dynamo voltage is below the voltage required for charging the accumulators. Consequently, for all dynamo voltages below the disconnecting voltage the accumulators are not in circuit with the dynamo and there is a relation between engine speed and dynamo voltage. By connecting the electro magnetic valve as a shunt across the said dynamo terminals, the pull on the armature bears a relation to the speed of the engine at least for a range of speeds below that corresponding to the disconnecting voltage.

Referring to the drawings filed herewith:

Figure 1 is a sectional elevation of one form of device made in accordance with this invention, embodying an electro magnetic valve.

Figure 2 is an end elevation of the device shown in Figure 1, with the manual control mechanism sectioned on the line 2—2, Figure 1.

Figure 3 is a diagrammatic assembly of the essential elements and controls as applied to an automobile.

Figure 4 shows an alternative form of the device made in accordance with this invention embodying a centrifugal governor.

Figure 5 shows a further alternative form embodying a hydraulic governor.

In Figures 1, 2 and 3 the device comprises a mild steel or cast iron casing 1 secured by studs 1b to a convenient portion 1c of the chassis or engine. The casing 1 is formed with an annual recess at one end having a central core 2 around which is disposed the windings 3 provided with leads 4, 4. The core 2 is drilled centrally with a bore 5 to receive a bronze plunger 5a with a flanged end 6 to which is riveted the armature 7 of mild steel or other magnetic material. The armature 7 is bored to be a free fit on the core 2. A cover plate 8 of brass or other non-magnetic material is screwed on to the casing 1 and, in addition to acting as a dust cover, serves as a stop to limit the movement of the armature 7 in one direction, the movement of the armature in the other direction being limited by the flange 6 coming into contact with the core 2, as shown in Figure 1.

The plunger 5a passes right through the casing 1 and has a waisted portion 9 which, in conjunction with ports 10 and 11 in the bore 5, acts as a piston valve. The other end of the plunger 5a has a reduced portion 13 which carries a compression spring 14 and passes through an externally threaded sleeve 15 which is screwed into the casing 1 and by adjustment of which the strength of the spring 14 can be regulated. To the end of the reduced portion 13 is screwed a collar 16.

The port 11 communicates with the induction system of the automobile engine through a ball valve element 17 screwed into the casing 1. The ball valve element is provided with a washer 18 having perforations 19, so that the ball 20 can act only as a one-way valve. The port 11 and the perforations 19 in the washer 18 are of such a size that air may be drawn freely therethrough when the port 11 is uncovered by the piston 5a. A small by-pass or leak 17a is provided in the valve seat for the purpose hereafter described. The ball valve element 17 is connected by tube 21 to the induction chamber 22 (Figure 3) of the automobile engine.

Disposed in a second valve chamber 23 is a piston valve plunger 24 having a waisted portion 25. One end of the piston valve plunger 24 is reduced to form a shoulder 24a with butts against an adjustable screw stop 26 screwed into the casing 1. The other end of the plunger 24 co-acts with a compression spring 27 in the bore in which the piston valve plunger 24 is housed. The piston valve plunger 24 has a coned end 28. Leading from the chamber 23 and in the same plane as the port 10, is a port 29 which communicates with the atmosphere through a narrow peripheral orifice formed by the machined surface 60 of casing 1 and a parallel rectangular plate 58 carried on casing 1 by screws 59.

An air passage 31 leads from the bore 5 direct to the bellows 32 and is always in communication with the chamber formed by the bore 5 and the reduced portion 9 of the plunger 5a.

The bellows 32 of rubber is secured by the bands 33 and 34 to the casing 1 and end plate 35 respectively. The end plate 35 is adjustably connected by a link 35a to one arm 36 of a bell crank lever mounted on a pin 37 supported from a bracket 37a bolted to a convenient part of the chassis, the other arm 38 being connected by a link 39 having lost motion slot 39a to a pin 40 on the clutch pedal 41. Slidably mounted in a boss 42 in casing 1 is a push rod 43 having an adjustable sleeve 44. One end of the push rod 43 is coned to co-act with the coned end 28 of piston valve 24 and the other end of the push rod 43 is pivoted to the arm 36 of the bell crank lever.

Engaging in the collar 16 is a yoke piece 45 carried on the end of the operating rod 46 which passes through a collar 47 mounted on the dashboard 48 and terminating in a handle 49. A pin 50 carried in the rod 46 is adapted to engage and be located by three notches 47a in collar 47.

The leads 4—4 are connected to the terminals of the dynamo 51 through contacts 52 conveniently mounted on the gear lever 53. The spring 52a urges the control lever 52b so as to close the contacts 52. The dynamo 51 is driven by the chain 54 from shaft 55 which is driven by the engine (not shown). Also connected to the dynamo terminals is the accumulator 56 through the usual magnetic cut-out 57 shown diagrammatically.

The operation of the device is as follows:—

In Figures 1, 2 and 3 of the drawings, the device is shown in the position corresponding to the clutch being in the engaged position and the speed of the engine being above the predetermined engaging speed. When the engine speed falls below the predetermined disengaging speed the potential difference at the terminals of the dynamo 51 falls, thereby weakening the strength of the electro magnet and allowing the armature 7 to be carried by the spring 14 until it comes into contact with the cover plate 8. It is to be noted here that the forces acting on the armature 7 are the dynamic forces consisting of the magnetic pull on the armature and the mechanical push of the spring. In addition to these two forces there are static forces due to friction in the moving parts. These static forces are, however, reduced to the minimum and, in any case, are relatively small in proportion to the dynamic forces. The movement of the armature is brought about by variation of the strength of the magnetic field, which either decreases sufficiently to allow the strength of the spring to overcome the magnetic pull or increases sufficiently to overcome the strength of the spring. It is well known that the strength of the magnetic pull increases very rapidly as the armature approaches the magnet. The strength of the spring 14 also varies according to the position of the armature but the increase or decrease is less rapid than that of the magnetic pull. The variation of the strength of the magnetic field does not take place rapidly because, when driving, the engine is prevented from rapidly accelerating or decelerating by reason of the inertia of the vehicle. Consequently, once this movement of the armature 7 commences it inevitably completes the movement. The armature 7 carries with it the plunger 5a opening the port 11 and closing the port 10. Air is drawn from the bellows 32 through the passage 31, port 11, past the ball valve 20 into the induction chamber. The bellows 32 close, raising the link 35a and operating the clutch pedal 41 through the bell crank lever and link 39, causing the clutch to be disengaged. As the arm 36 of the bell crank is raised, the push rod 43 is also raised and its conical end co-acts with the conical end 28 of the piston valve 24, thereby operating the valve and completely opening the port 29.

Thereafter, when the engine speed is raised above the predetermined engaging speed, the strength of the magnetic pull on the armature 7 is increased sufficiently to overcome the push of the spring 14 and the armature 7 is again moved to the position shown in the drawings. For a reason similar to that given above, the armature moves abruptly to the other end of its stroke. As the armature is further away from the magnet when in the disengaging position, the strength of the magnetic field necessary to attract the armature from the disengaging position, must necessarily be greater than to release the armature from its engaging position. It therefore follows that the engaging speed will be appreciably greater than the disengaging speed. The port 11 is closed and the port 10 opened. The port 29 being already open, air is freely admitted through the narrow peripheral orifice formed by the parallel surfaces 58 and 60, and through ports 10 and 31 into the bellows 32, which opens rapidly allowing the clutch to approach quickly its engaging position. The narrow space between 58 and 60 serves to silence the hissing sound of the inrush of air which would be somewhat objectionable. The length of the push rod 43 is adjusted so that as soon as appreciable torque is being transmitted by the clutch, and before the clutch is fully engaged, the conical end of the push rod 43 leaves the conical end 28 and allows the piston valve 24 to be returned by the spring 27.

The screw stop 26 is adjusted so that the ports 29 and 10 are almost completely sealed when the shoulder 24a butts against the stop 26. Air is then slowly admitted through the ports 29, 10 and 31 into the bellows, thus allowing the final engagement of the clutch to take place slowly and smoothly.

When the clutch is engaged, it may be disengaged by foot at any time independently of the governor by depressing the clutch pedal 41 as the pin 40 will slide in the lost motion slot 39a.

Furthermore, the clutch may be disengaged or engaged at any time irrespective of the speed of the engine for all speeds above the engaging speed by operating the control lever 52b and opening or closing the contacts 52. This alternative means of operating the clutch enables gear changing to be effected without using the foot and definitely reduces the fatigue of driving.

Should it be desired at any time to put the device out of action, the yoke 45 is pulled by pulling the handle 49 and is held in this position by engaging the pin 50 in the notch 47a nearest the handle. This has the effect of locking the plunger 5a in the position in which it is shown in the drawings.

Should it be desired to "coast" when travelling at any speed, the handle 49 is pushed and the pin 50 engaged in the other extreme notch 47a causing the plunger 5a to be moved until the induction port 11 is opened and the air port 10 is closed.

When the pin 50 is in the middle notch 47a as shown in Figure 3, the plunger 5a is free to move to either extreme position of its stroke by reason of the lost motion provided between the collar 16 and yoke 45.

Should the engine stop while "coasting", the vacuum in the induction chamber, as is well-known, is destroyed, and if no automatic one-way valve were provided, the clutch would suddenly re-engage and the sudden re-coupling of the stationary engine to the transmission would result in unpleasant shock.

In the construction shown in the drawings, the air leaks slowly past the small by-pass 17a in the ball valve seating into the bellows 32, allowing the clutch gradually to re-engage and re-start the engine. This by-pass is an important feature as it automatically ensures that the engine cannot remain stopped while the car is in motion, and at the same time prevents the clutch re-engaging abruptly should the engine stop.

Should it be desired when "coasting" to obtain quickly the benefit of engine braking, the handle 49 has only to be pulled to the extreme position furthest from the dashboard 48, allowing air to be rapidly admitted to the bellows and putting the device out of action. This is an important safeguard if the brakes should fail when "coasting" down a steep hill.

Where an additional or isolating clutch is provided behind the gear box, this also will be automatically operated through the link 14a which is connected to the engine clutch pedal, whenever the pedal is automatically operated.

Referring to Figure 4, which shows a centrifugal type of governor, $a$ is a shaft driven by the engine of the automobile and carrying on a flange $b$ the lugs $c$ on which are pivoted the bell cranks $d$, one arm of which in each case carries a spherical mass $e$ at the end. The other arms $f$ are adapted to co-act with a sleeve $g$ slidably mounted on the extension $h$ of the shaft $a$. The rounded end $j$ of the sleeve $g$ co-acts with the end $k$ of the plunger 5a, the stroke of which is limited at one end by the shoulder $l$. Coming against the face $m$ of the casing 1 and at the other end by the internal wall $g'$ of the sleeve $g$ coming against the end of the extension $h$. This device in other respects is the same as that shown in and described with reference to Figures 1 and 2.

When the speed of the engine rises above the predetermined engaging speed, the arms $f$, through centrifugal action on the spherical masses $e$, push the sleeve $g$ and the plunger 5a against the action of the spring 14 to one end of its stroke. When the speed of the engine falls below the predetermined disengaging speed, the reduced centrifugal force of the masses $e$ is insufficient to overcome the strength of the spring 14, which pushes the plunger 5a to the other end of its stroke. As in the device already described, the movement of the plunger 5a opens and closes the various ports, thereby operating the engine clutch.

Referring to Figure 5, which shows a governor of a hydraulic type $p^1$ and $p^2$ are a pair of gear wheels in mesh and driven by the engine in the direction shown by the arrows. These gears are contained in a close fitting casing $q$ constructed in the well-known manner to produce pressure in portion $r$ within the casing $q$.

A piston $s$ mounted in a cylinder $t$ secured to the casing $q$ carries a collar $n$ at one end which co-acts with the end $k$ of the plunger 5a. The collar $u$ limits the stroke of the piston in one direction while the shoulder $l$ serves to limit its stroke in the other direction by coming into contact with the face $m$ of the casing 1. In place of the bellows shown in the preceding figures, I employ a cylinder $w$ and piston $x$ which function in the same manner.

In the forms of device illustrated, I have shown a bellows type of pneumatic power mechanism. A diaphragm or piston type could be employed but I prefer the diaphragm or bellows type as the piston type is likely to develop leakage past the piston, for which some form of compensation would have to be made.

What I claim and desire to secure by Letters Patent is:—

1. In an automobile, a clutch, a power mechanism for operating said clutch, an electromagnetic valve associated with said power mechanism for automatically causing disengagement of said clutch when the speed of the engine is below a certain speed, a varying potential dynamo driven by the engine wherein said electro-magnetic valve is directly connected to said dynamo, and a secondary battery also connected to said dynamo through an automatic cut-in and cut-out, said valve being adjusted to operate automatically at predetermined dynamo potentials below the potential at which said secondary battery is cut in.

2. In an automobile having an electrical equipment comprising a dynamo driven by the engine and accumulators adapted to be charged by said dynamo, an electromagnetic control device connected in circuit with said dynamo, a clutch and power mechanism for operating said clutch, said electromagnetic control device operating due to the consequent changes in voltage of the dynamo, to cause disengagement of the clutch when the engine speed falls below a certain limit and to permit engagement of the clutch when the engine speed rises above a certain limit.

3. In an automobile having a clutch normally engaged, a gear box, a gear lever for operating said gear box, a power mechanism for operating said clutch, and an automatic governor associated with and adapted to control said power mechanism, said automatic governor comprising an electromagnetic device and a dynamo driven from the engine, said dynamo operating said electromagnetic device according to the speed of the engine, a manually operable switch for controlling said electromagnetic device to disengage said clutch independently of the speed of said engine, said switch being mounted on said gear lever and of the type normally held closed by a spring.

FELIX ALEXANDER JOSEPH.